May 6, 1941. H. W. SANFORD 2,240,670
WIDE FRAME MINE CAR
Filed May 20, 1939 3 Sheets-Sheet 1
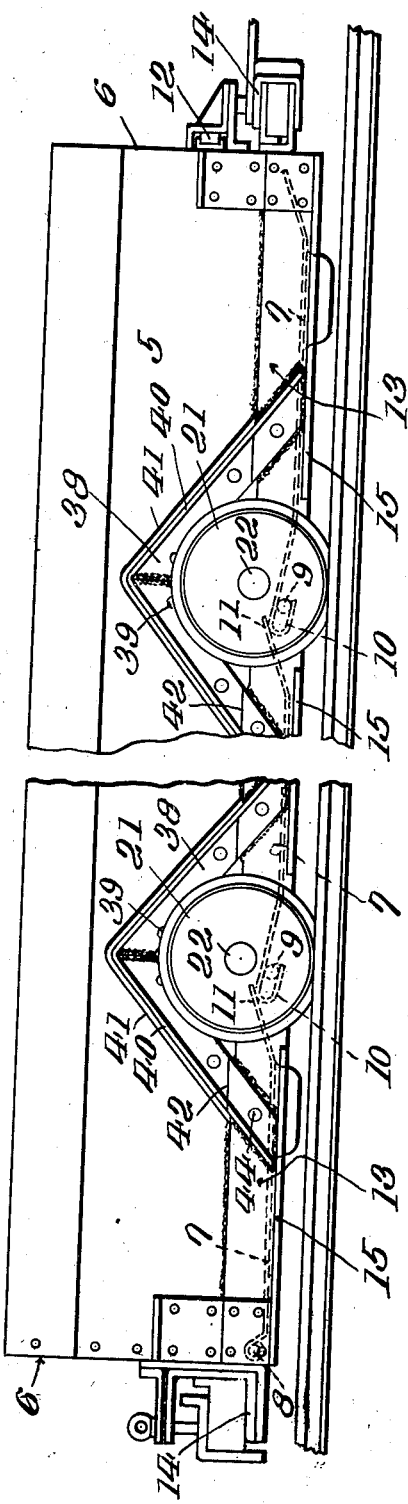
INVENTOR
Hugh W. Sanford
Mason & Porter
ATTORNEYS

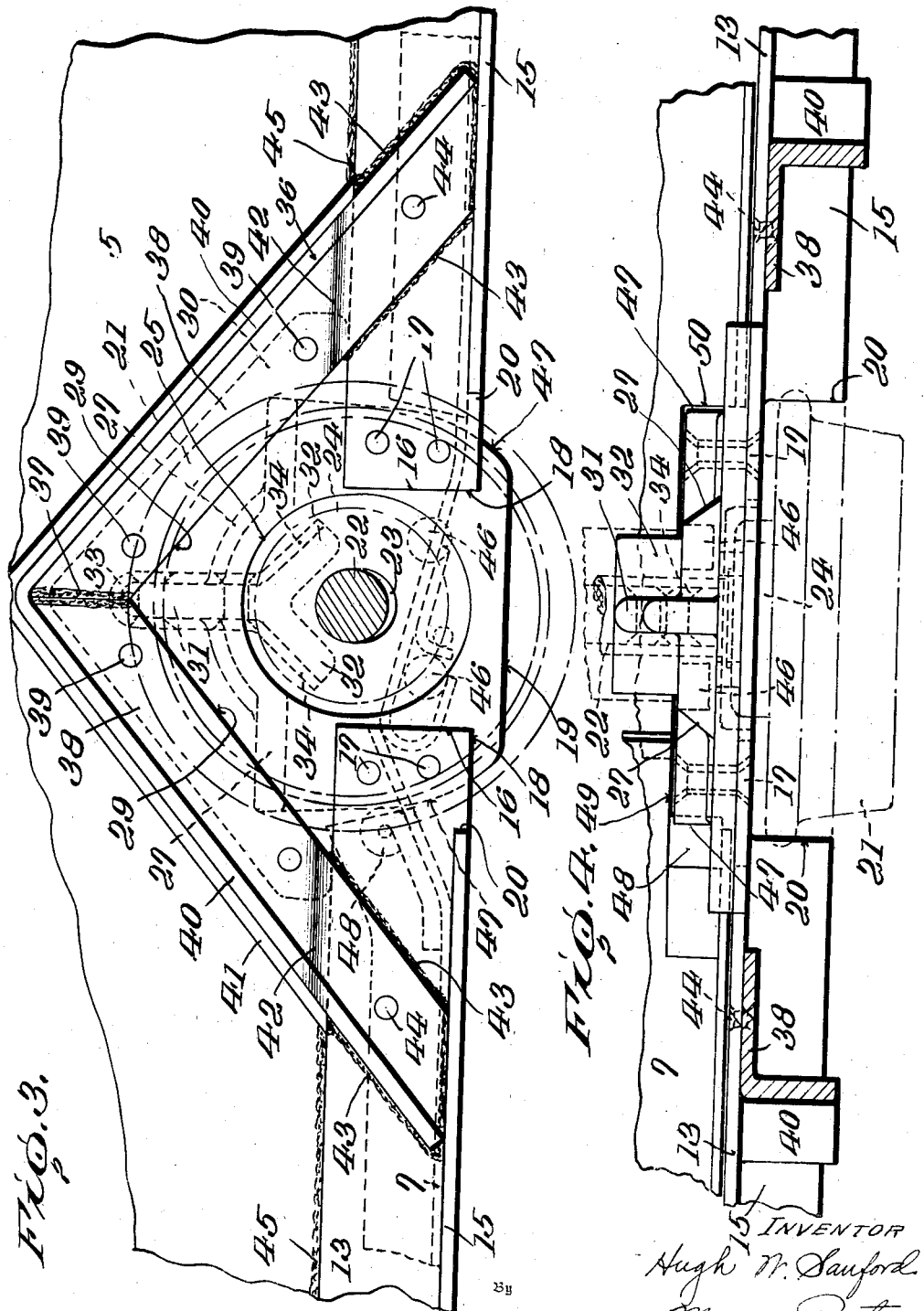

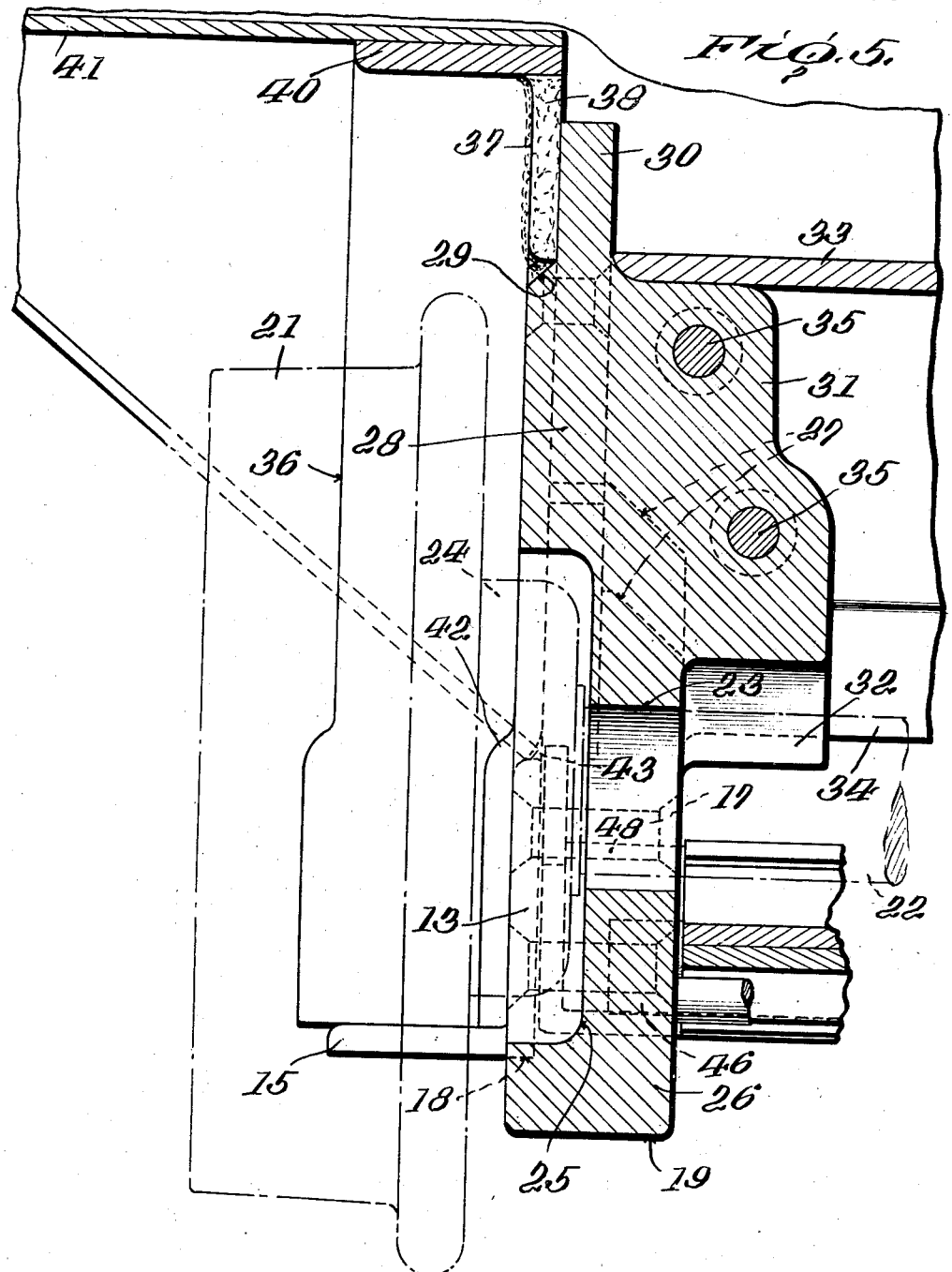

Patented May 6, 1941

2,240,670

UNITED STATES PATENT OFFICE 2,240,670

WIDE FRAME MINE CAR

Hugh W. Sanford, Knoxville, Tenn.

Application May 20, 1939, Serial No. 274,801

10 Claims. (Cl. 105—364)

The invention relates generally to mine cars or similar vehicles and primarily seeks to provide a novel car frame structure which will enable the provision of cars of this character which are relatively light in weight and inexpensive to manufacture, which are exceptionally strong and durable, and which provide the greatest amount of lading capacity possible within the limitations with respect to over-all dimensions and road clearances dictated by the conditions under which the cars must be used.

In vehicles of the kind referred to which operate underground in the limited space provided in mineral veins, it is advantageous to obtain the largest possible lading capacity for the same over-all dimensions, and it is therefore useful in cars having sill constructions inside the wheels to have these sills as wide apart as possible throughout their length. This is especially true where the car includes wing bottoms flared upwardly in the manner necessary in cars which discharge their lading centrally through drop doors and in end-dump and rotary-dump cars wherein the central lading bottoms cannot be extended horizontally to the extreme width of the cars because of the necessity of providing track clearances laterally of the wheels.

The central lading bottom in all such large capacity cars, being at the lowest level, and the flares normally starting at the sill line and extending upwardly therefrom, it is naturally advantageous to make the central lading-bottom portion between the sills as wide as it is practical to do so commensurate with a relatively cheap design of car and a relatively strong sill construction. What can be gained in the width of the central lading bottom between the wheel flanges, between the wheel hubs, and between the sills as they extend from wheel hubs towards the end lading walls of the car is beneficial in obtaining the desired maximum capacity under the imposed conditions.

Therefore, where each sill passes the wheel flanges, and before it reaches the wheel hubs, it is advantageous to have the upright portion of the sill in a plane lying very close to the adjacent wheel flanges. If the sill is to run straight through the lading body of the car and at the same time be close to the wheel flanges, it is obviously necessary in constructions where the wheels have hubs extending inside the wheel flanges, to cut away the vertical wall of the sill at the point where the wheel hub extension would interfere with it. In this way, the said vertical wall can be located closer to the wheel flanges. But, in order to cut the vertical sill wall away at these points, it is necessary to devise a cheap, light, and strong sill structure in the neighborhood of the wheels and wheel hubs which is amply strong to stand the various strains, stresses and shocks that occur when cars are hauled in trains. One of the principal objects of this invention is to provide a frame sill structure combination which makes possible the manufacture of a car with a very wide, low-lying central lading bottom portion, a car wherein the sill structure near the wheels will meet every requirement of use, and at the same time provide a design which is light and relatively inexpensive to manufacture, and which may be made in relatively straight lines, requiring little forging or expensive sheet metal work.

Another object of the invention is to provide a frame structure of the nature stated in which are included wheel and axle supporting pedestal members of novel standardized construction, enabling each pedestal member to be used at any wheel position on the car, and which include recesses for receiving sill and wheel hub portions to thereby facilitate wide spacing of the inner limits of the pedestal members and the sill members.

Another object of the invention is to provide a novel frame sill combination structure of the nature stated in which are included novel arch members attached in a novel manner to the respective sill and pedestal members to form a truss construction capable of absorbing hauling strains and minimizing the possibility of shearing sill and pedestal member securing rivets.

Another object of the invention is to provide in a frame sill combination structure of the nature stated including recessed sill members and arched trusses or sill supplementing members of the character mentioned, interchangeable pedestal members serving not only to fill up the space between the angles of the arch members so as to seal the side walls to the lading in the car, but also to provide stiffening members which when secured to the arched members and the sill serve to restore the strength of the sill to the extent to which it has been weakened by being recessed, without providing undesired bulk and weight. These pedestal members aid in the provision of the desired sill combination stiffness and rigidity and each forms the lower chord of the respective triangular truss, provides a bearing box for the axle including an oval shaped aperture to enable axle dropping on uneven trackage, provides integral lugs to which transverse tie members can be attached for preventing car spreading, and in cars of the bottom dump type, lugs for wedging the doors one way or another or for serving other necessary functions. Another important function of each pedestal member is to provide in its own structure a housing for the wheel hub of minimum outside diameter, a feature especially valuable where drop bottom cars are used because the doors do not have to be cut away for any material distance when the wheel hubs are thus housed by a compact pedestal structure.

Another object of the invention is to provide a frame sill combination structure in which the vertical wall portion of the sill is disposed very close to the wheel hub enclosing pedestal structure so as to present a substantially unbroken straight line vertical wall surface extending approximately from the wheel hubs to the ends of the car and also between wheel hubs at the same side of the car. This feature provides a substantially straight sealing edge for the doors of drop-bottom cars and eliminates all complicated offsetting or notching of door edges.

With the above and other objects in view that will hereinafter appear, the nature of the invention will be more fully understood by following the detailed description, the appended claims, and the several views illustrated in the accompanying drawings.

Figure 1 is a side elevation illustrating the invention embodied in a mine car of the bottom dumping type, parts being broken away.

Figure 2 is a rear end elevation of the car structure illustrated in Figure 1.

Figure 3 is an enlarged fragmentary side elevation at the position of one of the car wheels, the wheel having been removed for purposes of illustration.

Figure 4 is a horizontal section taken through the sill structure illustrated in Figure 3, the pedestal member being shown in plan view.

Figure 5 is a vertical cross section taken through the center of one of the pedestal members.

The structure herein disclosed as illustrating an example of practical embodiment of the invention peculiarly lends itself to adaptation in mine cars of the bottom dump type, but it is to be understood that the principles of the invention may also be adapted to use in mine cars of the rotary or end dumping types, or to other vehicles or cars carrying lading.

In the particular illustration made, the car body retaining walls are formed of side members 5 and end members 6, the side members or wing bottoms sloping inwardly and downwardly in the manner illustrated in Figures 1 and 5 of the drawings so as to shed the lading into the central longitudinal bottom dump opening which is controlled by drop doors 7 of any approved construction. It will be understood, of course, that when the features of the invention are to be embodied in mine cars of the rotary or end dumping types, the lading supporting bottoms will be rigidly attached, and the wing bottoms may leave the side sills below their tops or in any desired plane. In all cases, however, the lading supporting bottom equipment lying between oppositely disposed car wheels, whether it be rigid plating or hinged drop doors, always is disposed at least in part below the horizontal plane occupied by the wheel axes.

The three doors 7 are pivotally supported for being successively dropped in the well known manner, and the foremost door is pivoted as at 8. The other doors are pivoted on cross rods 9 which pass through elongated loops 10 formed in the door edges and which enable each door to be wedged into position for supporting the free edge 11 of a previously lifted door for the purpose of securing it in the lading supporting position. The free edge of the rearmost door is releasably secured in elevated position by employment of the conventional form of automatically actuated latching equipment 12. See Figures 1, 2 and 3.

The improved wide frame structure herein disclosed includes longitudinal parallel spaced sill members 13. In this particular illustration, the sill members are in the nature of L-beams, and they extend to the ends of the car which are equipped with the usual combined bumper and draw bar structures generally designated 14.

The sill members 13 include upwardly extending wall portions here shown lying in vertical planes, and sidewise extending flanges 15 which are here shown horizontal and at the bottom of the side sills. These sills can be made of various other shapes and sections providing they afford sufficient strength and rigidity. These sill members are interrupted or recessed at the positions of the wheels and wheel hubs in the manner illustrated in Figures 3 and 4 of the drawings, so that the vertical wall portions thereof terminate in spaced end portions 16 which are riveted as at 17 flush in receiving recesses 18 provided in the outer faces of pedestal members 19. Welding of the parts together can be substituted for riveting wherever desirable. It will become obvious as the description progresses that these pedestal members are of novel standardized right and left construction enabling use thereof at any wheel position on the mine cars.

The horizontal flanges 15 of the sill members are recessed or cut away as at 20 so that they will straddle each wheel 21, thus enabling the vertical wall portions of the sill members to be disposed very close inside the wheel flanges. Thus the horizontal flange portions of the sill members as they extend from element 20 towards the adjacent ends of the lading body may be full width and they are shown here full width in these locations and hence they may be said to be directed outwardly across the plane of rotation of the wheel flanges.

The wheels of each opposed pair are mounted on an axle 22 having bearing in bores 23 formed in the respective cooperating pedestal members, and the inwardly projecting hub 24 of each wheel extends into a receiving recess 25 formed in the opposed face of the respective pedestal member. By this manner of constructing and arranging the parts, there is provided a minimum of spacing between the vertical wall portions of the sill members and the wheel flanges at each side of the car, and a maximum of spacing between the vertical wall portions of said sill members at opposite sides of the car.

It will be observed by reference to Figures 3, 4 and 5 of the drawings that each pedestal includes a relatively thick lower portion 26 which merges, by a lading shedding downwardly and inwardly inclined setback 27, with a thinner upper portion 28, and this upper portion is additionally reduced in the manner illustrated in the figures mentioned to provide a seating shoulder 29 and an attaching flange 30 both shaped to form an upwardly presented obtuse angle, as illustrated in Figure 3.

Each pedestal also includes an inwardly directed central rib 31 terminating at its lower extremity in a pair of flare lugs 32 which spread over the axle bearing aperture 23 in the manner best illustrated in Figure 3. Each cooperating pair of pedestal members is rigidly joined by a cross tie member 33 including parallel wall portions which embrace the rib 31, and axially protecting lading shedding portions 34 which engage the flare lugs 32. The tie members 33 are riveted or otherwise secured to the ribs 31 as at 35.

An arch member 36 is arched over the interrupted opposing sill member ends at the position of each wheel, and each arch member preferably is formed of an angle iron split at 37 and bent to form an obtuse angle conforming to the angle of the respective seating shoulder 29. Each arch member thus presents a horizontal hood supporting flange and includes a vertical flange 38 which is disposed in the same vertical plane occupied by the vertical wall portions of the underlying sill members, see Figures 3, 4 and 5. The horizontal flanges of the arch members are designated 40 and serve as supports for hood plates 41 which overlie and facilitate removal of the wheels in the well known manner.

Positioning of the vertical flange portions 38 of the arch members in the same vertical plane occupied by the vertical wall portions of the sill members is provided for by offsetting the flange portions 38 outwardly over said sill portions as at 42. The arch member flange splits 37 preferably are welded, and the offset ends thereof are welded inside and out, as at 43, to the portions of the sill members engaged thereby.

It is preferred that in the assembly of the frame structure the ends of the arch members be wedged slightly apart, or placed under tension, and riveted as at 44 to the sill members while under tension so that when they are permanently united by welding as at 43 the tensioned condition of the arch members will be retained and the pedestal members and particularly the rivets 17, thus spared much of the shearing stresses which would ordinarily be imposed thereon by reason of the fact that the arch members will thus be made to absorb much of the haulage strain.

The downwardly and inwardly inclined side wall plating 5 preferably is edge abutted with the upper terminus of the vertical wall portions of the sill members and is welded thereto as at 45, see Figures 3 and 5 of the drawings.

As has been previously stated, each pedestal member is standardized so that each comprises a right or left hand unit and can be mounted at any wheel position about the mine car. For this purpose each pedestal member is provided with a pair of selective door pivot rod seats 46 and a pair of selective wedging or camming surfaces 47 one only of each of which will be effective depending upon the side of the car upon which the pedestal member is mounted. As each of the doors equipped with the elongated loop portion 10 is swung upwardly to its bottom closing position, suitable abutment members 48 attached at the opposite sides of the free edge portion thereof will engage the opposed camming surfaces 47 of the pedestal members adjacent the free edge of that door and cause the door to be forced forwardly on the pivot rod thereof, or to the left as viewed in Figure 1 of the drawings, so that the loop-hinged edge of said door will underlie and secure the free edge of the previously raised door. The last raised door is, of course, secured by the latch equipment 12 hereinbefore referred to, in the well-known manner.

The free edge portions of the doors are suitably cut away as at 49 to clear the plate portion 26 of each pedestal member, and the hinged portions of the doors are similarly cut away as at 50 for the same purpose, thus enabling the doors to lie in close sealing relation with the pedestal members and the vertical wall portions of the sill members between which the doors function.

The arch members 40 are formed of rolled steel angles, bent plate or structural shapes and are distinguished from castings in that they are of fibrous structure strongly resistant to tensile stresses and strains. It will be observed that these arch members in combination with the pedestal members tie the car together in a way that brings into play the lading wing bottoms of the car as an effective addition to strengthen the car against twisting or warping. Moreover, the lading wing bottom is fastened so securely to the wheel hood structures that a great deal of the tension of the haulage is taken off the pedestal casting members and is conveyed around the rivets that secure the pedestal casting members to the ends of the sill structure.

It will be obvious also that the same type of frame construction shown in Figures 3 and 4 can be used in a car having its main body sills outside of the wheels, rather than inside as herein shown. In such a construction the upright section of the main sill could be cut away where the wheel hub normally projects in front in any design where it is considered advisable to bring this sill close up to the track line on the outside.

In the foregoing description, I have referred at places to sills or sill members, and at other places to a novel frame sill combination structure. The sills or sill members relate, of course, to the longitudinally disposed angle members including the upright wall portions 13 and the outwardly directed horizontal flange portions 15, where as the sill combination structure referred to or the sill structures defined in the appended claims include not only the sills or sill members but also the arch or truss members 36 and the chord forming pedestal members 19 all of which are secured together to form said combination structure. Therefore, when it is said herein that the sills or sill members are cut away at the positions of the wheel hubs, it is not to be understood that the sill structure as a whole is cut away. It will be obvious that the sill structure as a whole, or the combination sill structure, is merely offset around the wheel hubs.

It is of course to be understood that the details of structure and arrangement of parts may be variously changed and modified without departing from the spirit and scope of my invention.

I claim:

1. In a car for handling lading, the combination of a lading body having end and side wall portions, wheels and supporting axles, substantially parallel sill structures located close to and passing between oppositely disposed wheels and extending longitudinally substantially from end to end of the lading body, a part of one of the said sill structures between an end lading body wall and an adjacent wheel having upright portions forming lading space defining walls and stiffening portions extending outwardly away from the said upright portions, each of the said sill structures also including arch portions having outwardly extending stiffening sections located directly above the tops of adjacent wheels and substantially vertical sections occupying a general plane located inside of and close to the vertical plane of the inside of the tread of the adjacent wheel, said substantially vertical sections reaching to the top of said wheel, said arch portions being in rigidly secured face to face relationship with the said upright portions of the sill structure outside the peripheral limits of the wheels, and said upright portions of each of said sill structures being interrupted close to an axle, means in rigidly secured relationship with the interrupted portions of the sill structure within the peripheral limits of the wheels and extending around the adjacent wheel axle, and a central lading bottom sealing the space between oppositely disposed sill structures and having at least portions thereof lying below the horizontal plane of the axes of the wheels.

2. A car as defined in claim 1 in which the general plane of the outside walls of the said substantially vertical sections of the arch portions cut the inner hubs of the adjacent wheels.

3. A car as defined in claim 1 in which the said means extending around the adjacent axle and connecting the interrupted upright portions of the sill structures comprises a pedestal casting which is distinct from and is in rigidly secured relationship with the said arch portions.

4. A car as defined in claim 1 in which the said means extending around the adjacent axle comprises a pedestal casting which is distinct from and provides a housing for the adjacent wheel hub, a bearing for the associated axle and a side closure wall that prevent leakage of lading underneath the said arch portions and above the central lading bottom adjacent thereto.

5. In a bottom dumping mine car, the combination of flanged wheels and axles, longitudinally disposed parallel spaced sill members supported by the axles and including vertical wall portions disposed very close to the wheel flanges and horizontal outwardly directed bottom flange portions recessed to straddle the wheel flanges, said wall portions being interrupted to form spaced end portions and permit intersection thereof by said axles, means reinforcing said wall portions at the interruptions therein, wing bottom plating secured to and flaring upwardly and outwardly from the upper limits of said sill members, arch members formed of angle iron to present vertical and horizontal flange portions, said vertical flange portions being secured to the reinforcing means and the spaced sill member ends with the reinforcing means engaging portions of the vertical flanges in the same vertical plane as the sill member vertical wall portions, wheel hoods supported by said arch members, and lading supporting bottom means intervening said sill members and disposed in a general plane below the horizontal plane occupied by the wheel axes.

6. A mine car equipment as defined in claim 5 in which the reinforcing means comprises a pedestal member opposed to each wheel and having an axle bearing aperture therein and recessed to receive the spaced sill member ends, flange portions secured to said sill member ends and the arch members, and inwardly extended ribs terminating in downwardly flared portions overlying the axles; and a cross tie member overlying each axle and including opposed parallel wall portions attached at their ends to the ribs and downwardly flared portions engaging said flared rib portions.

7. In a mine car, an axle bearing pedestal member comprising a generally flat body adapted to oppose the flanged inner face of a wheel and having an axle bearing aperture therein and a surrounding wheel hub receiving face recess and sill member end receiving recesses in the face thereof to oppose said wheel, sill members extending in longitudinal alignment and each including a vertical flange secured flush at its end in one of the end receiving recesses and a horizontal flange directed outwardly across the plane of rotation to be occupied by the wheel flange, and an arch member of angle iron having horizontal and vertical flange portions, said arch member having the ends of its vertical flanges offset over and secured to the opposed sill member ends whereby the vertical flanges of the sill members and the vertical flange portion of the arch member occupy the same vertical plane.

8. In a mine car wherein is provided a plurality of drop doors in its longitudinal section, and a lading body including wing bottoms sloped outside the track lines to discharge the lading through the openings provided by the doors when dropped; the combination of flanged car wheels having inwardly projecting hubs, and side sill structures extending longitudinally substantially from end to end of the lading body of the car and providing upright walls presenting substantially straight sealing surfaces for cooperation with the doors when raised, said upright walls passing close to the inside of the adjacent wheel flanges and lying in upright planes cutting the adjacent wheel hubs.

9. In a mine car wherein is provided a plurality of drop doors in its longitudinal section, and a lading body including wing bottoms sloped outside the track lines to discharge the lading through the openings provided by the doors when dropped; the combination of flanged car wheels having inwardly projecting hubs, and side sill structures extending longitudinally substantially from end to end of the lading body of the car and providing upright walls presenting substantially straight sealing surfaces for cooperation with the doors when raised, said upright walls passing close to the inside of the adjacent wheel flanges and lying in upright planes cutting the adjacent wheel hubs, said sill structures including outwardly extended stiffener flange portions which are recessed to straddle the wheel flanges.

10. In a mine car of the bottom dumping type, a standardized right or left axle bearing pedestal member comprising a generally flat body adapted to oppose the flanged inner face of a wheel and having an axle bearing aperture therein and a surrounding wheel hub receiving face recess and sill member end receiving face recesses, attaching flange portions, an inwardly projecting cross tie attaching rib, standardized oppositely directed door wedging surfaces, and a door pivot receiving recess associated with each said wedging surface.

HUGH W. SANFORD.